H. DROUTLEGE.
APPARATUS FOR MILKING COWS.
APPLICATION FILED MAY 28, 1915.
1,236,413.
Patented Aug. 14, 1917.
2 SHEETS—SHEET 1.
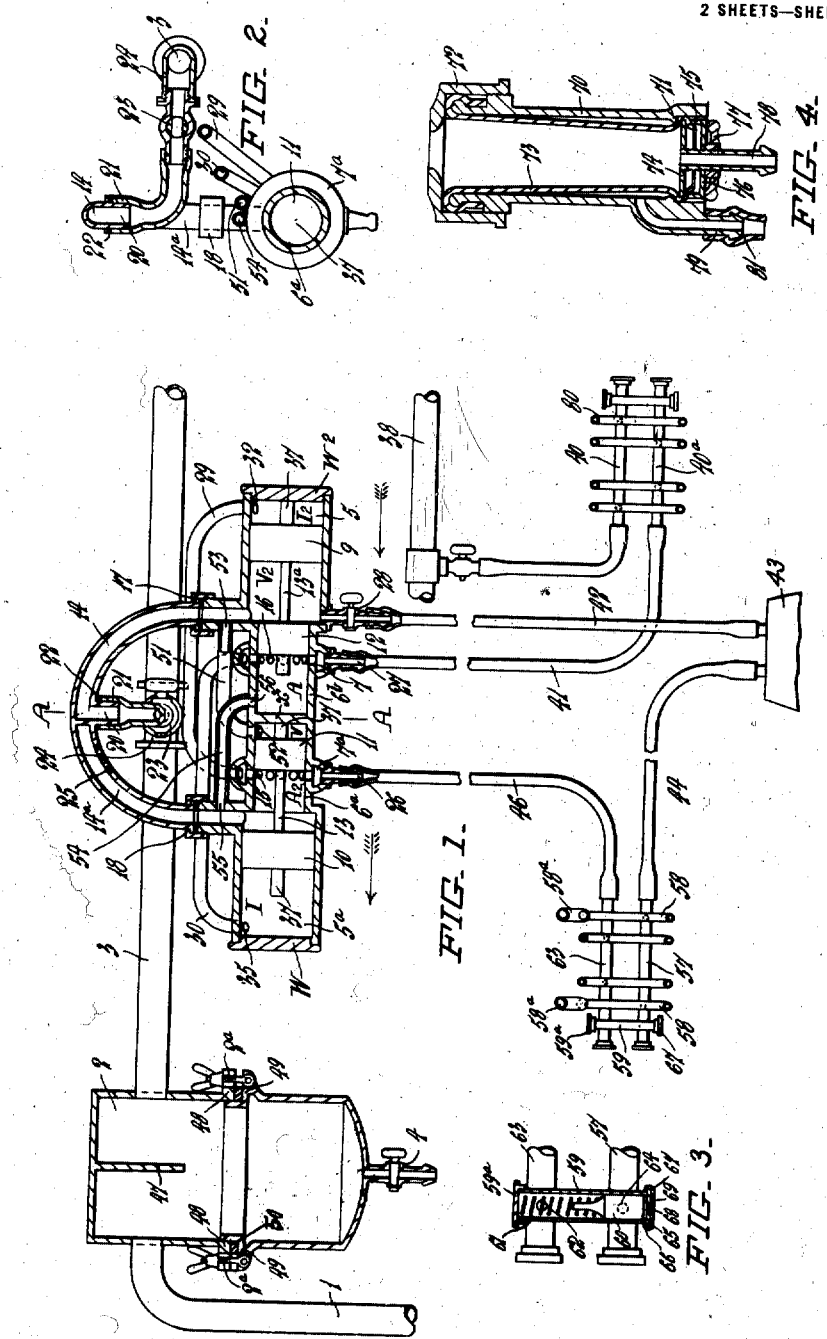
H. Droutlege.
Inventor.
By
Attorney.

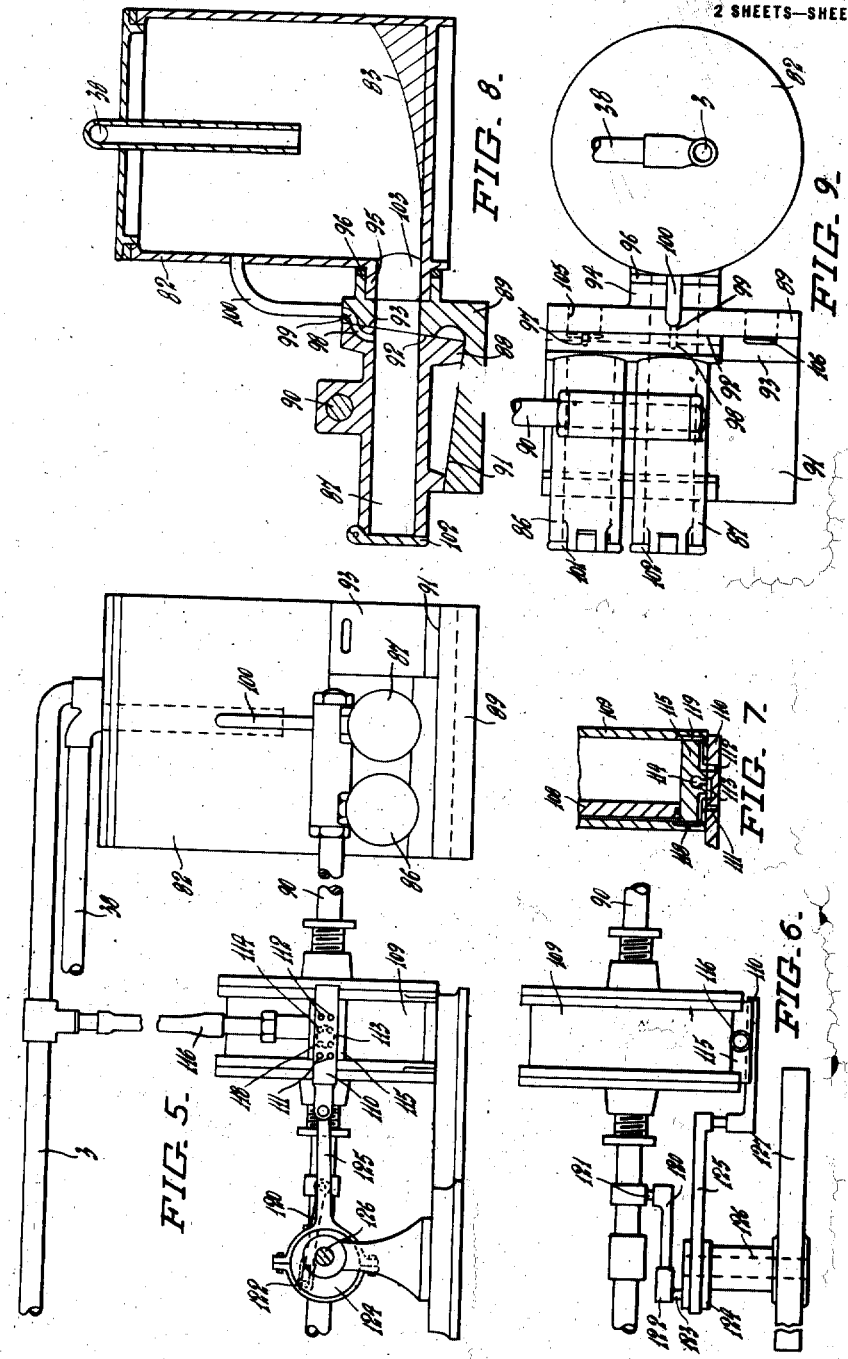
H. DROUTLEGE.
APPARATUS FOR MILKING COWS.
APPLICATION FILED MAY 28, 1915.
1,236,413.
Patented Aug. 14, 1917.
2 SHEETS—SHEET 2.
H. Droutlege,
Inventor.

UNITED STATES PATENT OFFICE.

HENRY DROUTLEGE, OF AUCKLAND, NEW ZEALAND.

APPARATUS FOR MILKING COWS.

1,236,413.  Specification of Letters Patent.  Patented Aug. 14, 1917.

Application filed May 28, 1915. Serial No. 30,872.

*To all whom it may concern:*

Be it known that I, HENRY DROUTLEGE, a citizen of the Dominion of New Zealand, and residing at 47 Vermont street, Ponsonby, Auckland, in the Provincial District of Auckland, in the Dominion of New Zealand, have invented certain new and useful Improvements in Apparatus for Milking Cows, of which the following is a specification.

This invention relates to apparatus for milking cows and provides improvements in the pulsator, the teat cups, the cradle, and the releaser of such apparatus.

The pulsator comprises two cylinders each cylinder having an extension of smaller diameter and pistons fitting each cylinder and its extension. The space between the pistons in one cylinder is constantly open to the atmosphere and the corresponding space between the pistons of the other cylinder is constantly open to an air exhauster. The spaces between the ends of the cylinder and the pistons are alternately open to the atmosphere and the air exhauster. The pistons travel in the cylinder under atmospheric pressure, and ports in the cylinders are alternately opened by the pistons to atmospheric pressure and to the air exhauster. These ports communicate with pipes leading to the teat cups, the linings of which are thereby pulsated.

In the teat cup the lower end of the rubber liner or inflater tube is held between a circular plate and a flanged disk which passes freely upon a screwed nipple projecting from the plate. A wing nut screwed on the nipple forces the disk toward the plate.

The claw or cradle is provided with means for admitting sufficient air to the milk pipes to allow the milk to flow freely.

The releaser comprises a receiver and one or more reciprocating chambers. There are usually two of such chambers and they are alternately brought by their reciprocation into correspondence with an outlet from the receiver, and receive a charge of milk therefrom. The milk is discharged through a valve with which each chamber is provided, and which is normally kept upon its seat by gravity and by the vacuum in the receiver.

The motor for driving the releaser comprises a cylinder having its piston rod connected to the reciprocating chambers of the releaser. A slide valve on the cylinder consists of a plate perforated with two ports and having a recess which is constantly open to an air exhauster. The ports and recess are brought alternately into communication with ports leading to the ends of the cylinder. The slide valve is reciprocated by an eccentric from the face of which a pin projects. This pin enters the end of a connecting rod, the other end of which is connected to the piston rod. The pin is given lateral play in the connecting rod, so that at each reversal of the stroke of the slide valve, the momentum of a fly wheel travels the slide valve a certain distance before the chambers move.

The improvements will now be described in detail by aid of the accompanying drawings:—

Figure 1, is a diagrammatic sectional elevation of the pulsator, vacuum tank, and milk claws.

Fig. 2, is a cross sectional elevation on line A—A Fig. 1.

Fig. 3, is a plan of part of a milk claw with an air admission pipe in section,

Fig. 4, is a sectional elevation of a teat cup,

Fig. 5, is an elevation, and

Fig. 6, a plan of part of a releaser,

Fig. 7, is a sectional plan through the slide valve,

Fig. 8, is a sectional elevation of the releaser receiver and its chambers, and

Fig. 9, is a plan thereof.

The vacuum pipe 1 is connected to any suitable exhauster which will exhaust air from the vacuum tank 2 and the vacuum pipe 3.

Cylinders 5 and $5^a$ have respectively extensions $6^b$ and $6^a$ of smaller diameter. A partition $x$ separates the extension $6^a$ from the extension $6^b$. The extension $6^a$ is encircled by an annular chamber $7^a$, and similarly the extension $6^b$ is encircled by an annular chamber 7. The chamber $7^a$ communicates with the extension $6^a$ by means of ports 15, and the chamber 7 communicates with the extension $6^b$ by ports 16. Pistons 10 and 11 connected together by a rod 13 fit the cylinder $5^a$ and the extension $6^a$ respectively, and the pistons 9 and 12 connected together by a rod $13^a$ fit the cylinder 5 and the extension $6^b$ respectively.

A pipe 14, communicating with the cylinder 5, is connected thereto by a union nut 17, and a pipe $14^a$, fixed at one end to the pipe 14, communicates with the cylinder $5^a$, and is connected thereto by a union nut 18. The pipe 14 is provided with a nipple 20, adapted to slide into a socket 21, a tight joint being made by a washer 22.

The socket 21 is formed by turning up the end of a stop cock 23, which is screwed into a T piece 24 on the vacuum pipe 3 and forms a bracket whereon the pulsator is supported when in use.

The pipe 14ª communicates with the atmosphere by air inlets 25.

The space V² between the pistons 9 and 12 is constantly open to the vacuum pipe 3 through the pipe 14 so long as the cock 23 is open, and the space A² between the pistons 10 and 11 is constantly open to the atmosphere through the pipe 14ª and its holes 25.

A tube or passage 29 forms a communication between a port 32 near the outer end of the cylinder 5 and the chamber 7ª. Another tube or passage 30 forms a communication between a port 3⁻ near the outer end of the cylinder 5ª and the chamber 7. Another tube or passage 51 forms a communication between a port 52 near the inner end of the extension 6ª and the port 53 in the inner end of the cylinder 5. The space V is thus constantly open to the space V². Another tube 54 forms a communication between a port 55 in the inner end of the cylinder 5ª and a port 56 near the inner end of the extension 6ᵇ. The space A is thus constantly open to the atmosphere.

The pistons have projections 37 which act as buffers which come into contact with the covers W and W² or the partition x and limit the travel of the pistons.

The milk pipe 38 leading to a releaser to be described hereinafter is connected to the milk pipe 40 of a cradle in the ordinary way. The pulsation tube 40¹ of such cradle is connected by a pipe 41 and a nipple 27 to the chamber 7. When the releaser is not used, the usual vacuum milk bucket 43 is connected by a pipe 42, and stop cock 28 to the space V² between the pistons 9 and 12. A constant vacuum is thus maintained in the milk bucket, which is connected to the milk pipe 57 of another cradle by a flexible pipe 44. The pulsation tube 63 of the latter cradle is connected by a tube 46 and a nipple 26 to the chamber 7ª.

The vacuum tank 2 is made in two parts, held together by clasping screws 2ª. An upper part has a deflector 47, to prevent vapor or other matter from being drawn from the pipe 3 into the air exhauster. A lower part of the tank 2 has a draw off cock 4. The rims of the two parts have flanges 48 and 49 telescoped together, and an airtight joint is made by a rubber washer 50.

Referring more particularly to Fig. 3, which shows a device for admitting air to the milk pipe 57 of the cradle, to the milk pipes 58 of the claw and to the flexible pipes 58ª connecting the pipes 58 to the teat cups shown in Fig. 4 to be hereinafter described:—A tube 59 having ports 62 and 64 communicating with the pipes 63 and 57 respectively, contains a slide valve 60 which normally is held over and closes the port 64 by a light spring 61. The tube has an end 65 in which is a port 68. A cap 67 is rotatable on the end of the tube 59 by milling its rim over the flange 66 formed on the tube. The cap has a port 69 adapted to be brought into correspondence with the port 68 when the cap is turned, for the purpose of admitting air in any desired quantity to the milk pipe 57. The other end of the tube has a cap 59ª removable for cleaning purposes.

Referring to Fig. 4, the casing 70 of the teat cup open at the bottom and provided with an internal shoulder 71, has a cap 72 which screws upon the casing and grips the upper end of the rubber lining 73 against the top of the casing. The bottom end of the lining is gripped between a plate 74 and the flanged edge 75 of a disk 76 by means of a wing nut 77 screwed upon a nipple 78 of the plate 74. A nipple 79 in the side of the casing is connected to a claw branch 80 by a flexible tube 81.

The plate 74 and the disk 76 are first fixed in position on the bottom of the lining 73, which is then inserted in the casing 70, its upper end is folded over the casing and gripped by the cap 72. When the nipple 79 is open to the air exhauster, the rubber lining seats upon the shoulder 71 and prevents air from passing into the casing 70.

Referring to Figs. 5, 6, 7, 8 and 9, the vacuum pipe 3 and the milk pipe 38 enter the receiver 82 of the releaser which has an inclined bottom 83 and is supplied with milk through the said milk pipe 38, air being exhausted through the pipe 3 from the receiver 82.

The releaser chambers 86 and 87 having an inclined base 88 are reciprocated by a piston rod 90 upon a slide bracket 89 having an inclined bed 91.

The chambers 86 and 87 have an inclined valve face 92 common to both which slides against a correspondingly inclined face 93 of the bracket. The bracket has a socket 94 which fits upon a spigot 95 projecting from the receiver, an airtight joint being made by a rubber washer 96.

The inclination of the bed of the slide bracket causes the valve face 92 to press against the face 93 and thus to fit airtight.

Each of the releaser chambers 86 and 87 has a port 97 and 98 respectively, which ports alternately come into correspondence with a port 99 in the face 93, the said port 99 communicating by a pipe 100 with the interior of the receiver.

Each chamber is provided with a flap valve 101 and 102 respectively, which valves are pivoted at their upper ends and tend to close by gravity.

The releaser chambers 86 and 87 are shown tubular in shape but they can be made in any convenient form provided they are adapted to be reciprocated across the opening 103 of the spigot 95 and thereby alternately become charged with milk from the receiver, vacuum being produced in each chamber alternately through the pipe 100, and air being admitted when the ports 97 and 98 respectively come into correspondence with slotted openings 105 and 106 through the face 93 of the bracket, thereby causing the milk to flow out through the valves 101 and 102.

A single releaser chamber can be used and receive and discharge milk alternately as it is reciprocated in the manner described. In that case the milk accumulates in the receiver during the time that the releaser chamber is being discharged.

The releaser chambers 86 and 87 are reciprocated by a piston 108 working in a cylinder 109 and fixed upon the piston rod 90. The slide valve 110 consists of a plate having ports 111 and 112 and a recess 113. A port 114 in the valve face 115 of the cylinder is in communication with the vacuum pipe 3 by means of a pipe 116, and the said port 114 in constant communication with the recess 113. Ports 118 and 119 extend from the valve face 115 to the respective ends of the cylinder. The ports are arranged as shown in Fig. 7, so that when port 118 is open to the atmosphere, then port 119 is open to the recess 113, and vice versa.

The slide valve 110 is reciprocated by means of a connecting rod 120 pivoted upon a pin 121 projecting from the piston rod 90. The other end 122 of the rod 120 receives a pin 123 projecting from the face of an eccentric 124. Lost motion is provided by elongating the hole in the end 122.

The movement of the eccentric is communicated to the slide valve by an eccentric rod 125. A fly wheel 127 is mounted upon the shaft 126 of the eccentric.

The apparatus operates as follows:—

When the pistons are in the positions shown in Fig. 1, and the space $V^2$ is open to the air exhauster, the milk bucket 43 and the space V are open to the space $V^2$ by the pipes 42 and 51 respectively while the space $A^2$ is open to the atmosphere and the spaces A and $I^2$ and the pulsation pipe 63 are open to the space $A^2$ by the pipes 54, 29 and 46 respectively.

The area of the piston 9 exposed to air pressure being greater than the area of the piston 12 similarly exposed, the pistons 9 and 12 slide forward in the direction shown by the arrow. The piston 12 crosses the ports 16 and the chamber 7, the inflation pipe 40ª and the space I (by means of the pipe 30) being opened to the air exhauster. The area of the piston 10 exposed to air pressure being now greater than the area of the piston 11 similarly exposed the pistons 10 and 11 move forward in the direction shown by the arrow. The piston 11 crosses the ports 15 and opens the chamber 7ª and the inflation pipe 63 to the air exhauster. The space $I^2$, being in communication with the chamber 7ª by the pipe 29, is now exhausted of air when the pistons 9 and 12 return to the position shown on the drawing and the operations recommence.

The milk pipes 57 and 40 and the claw branches 58 are constantly open to the air exhauster and these branches are connected to the nipples 78 of the teat cups. The interior of the lining 73 is thus constantly open to the air exhauster. The nipples 79 of the teat cups being connected by pipes 81 to the inflation pipes 40ª or 63, the exterior of the lining 73 is alternately open to the atmosphere and to the air exhauster, and the necessary pulsations for milking purposes are thus given.

When the pipe 41 or 46 is open to the air exhauster, air is drawn from the pipe 59, and the port 68 being in correspondence with the port 69, the atmospheric pressure forces forward the valve 60 against the pressure of the spring 61.

The port 64 is uncovered and air is admitted to the milk pipe 57 or 40. When the said pipe 41 or 46 is open to the atmosphere, the air pressure and the spring 61 return the valve 60 to the position shown in Fig. 3.

When a considerable number of cows have to be milked simultaneously, a releaser or releasers are used in place of the milk bucket 43. As shown in Figs. 5, 6, and 7, the piston 108 is commencing its return stroke. The momentum of the flywheel 127 moves the slide valve 110 by means of the eccentric 124, while the pin 123 is moved idly in the elongated hole in the end 122. At each end of its stroke the slide valve commences its travel before the piston rod commences to move, the port 119 is connected to the port 114 by the recess 113, the port 111 is put into correspondence with the port 118, the air is exhausted from the cylinder through the port 119, air is admitted through the ports 111 and 118, and the atmospheric pressure forces the piston forward thereby reciprocating the releasing chambers 86 and 87. The operations are reversed at the end of the stroke and a reverse action takes place.

What I do claim and desire to secure by Letters Patent of the United States is:—

1. In apparatus for milking cows, a pulsator comprising two cylinders, an extension of smaller diameter to each cylinder, pistons connected together in two pairs and fitting the cylinders and the extensions, means for maintaining the spaces at one of the ends of each extension constantly open to the atmosphere and the spaces at the other ends of each extension constantly exhausted of air, means whereby the spaces between the ends of the cylinders and the pistons are alternately open to the atmosphere and exhausted of air, and a pulsation tube communicating with each cylinder extension at the center of the stroke of the part of the piston operating therein.

2. In apparatus for milking cows, a pulsator comprising two cylinders, an extension of smaller diameter to each cylinder and provided with lateral ports, pistons connected in two pairs together and fitting the cylinders and the extensions, and means for maintaining the space between the pistons in one cylinder constantly open to the atmosphere and the corresponding space in the other cylinder constantly exhausted of air, means whereby the spaces between the ends of the cylinders and the pistons are alternately opened to the atmosphere and exhausted of air by the pistons crossing said ports in the extensions, comprising passages connecting said ports with the said spaces at the ends of the cylinders, and a pulsation tube communicating with each extension in the same cross sectional plane thereof as the said ports.

3. In apparatus for milking cows, a pulsator comprising two cylinders, an extension of smaller diameter to each cylinder and provided with lateral ports, pistons connected together in two pairs and fitting the cylinders and the extensions, means for maintaining the space between the pistons in one cylinder in constant connection with the atmosphere and the inner end of the extension of the same cylinder in connection with an air exhauster, means for maintaining the corresponding space between the pistons in the other cylinder in constant connection with the air exhauster and the inner end of the extension of the said other cylinder in connection with the atmosphere, annular chambers encircling the extensions and connected therewith by ports, and a pipe leading from each of the chambers to the end of the other cylinder, the pistons of the extensions crossing the said ports whereby the chambers and the ends of the cylinders are alternately open to the atmosphere and to the connection with the air exhauster.

4. In apparatus for milking cows, a pulsator comprising two cylinders, an extension of smaller diameter to each cylinder, pistons connected together in two pairs and fitting the cylinders and the extensions, pipes connected together at their ends and leading to the spaces between the pistons of the cylinders, a nipple upon one pipe, a vacuum pipe, a stop cock on the vacuum pipe and having a socket wherein the nipple fits, a rubber washer making a tight joint between the nipple and socket, and the other pipe being open to the atmosphere by means of ports, the said pipes and stop cock forming a support for the pulsator.

5. In apparatus for milking cows, a pulsator comprising two cylinders, an extension of smaller diameter to each cylinder, pistons connected together in two pairs and fitting the cylinders and the extensions, means for maintaining the space between the pistons of one cylinder constantly open to the atmosphere and the corresponding space in the other cylinder constantly exhausted of air, annular chambers encircling the extensions and connected therewith by ports, a tube upon each cylinder whereby the end of each cylinder is connected to the annular chamber encircling the extension of the other cylinder, a tube connecting the space in the cylinder open to the air exhauster between the pistons and the end of the extension to the other cylinder and a corresponding tube connecting the space in the cylinder open to the atmosphere between the pistons and the end of the extension to the other cylinder.

6. In apparatus for milking cows, a pulsator comprising two cylinders, an extension of smaller diameter to each cylinder, pistons connected together in two pairs and fitting the cylinders and extensions, means for maintaining the space between the pistons in one cylinder constantly open to the atmosphere and the corresponding space in the other cylinder in constant connection with an air-exhaust, means whereby the spaces between the pistons and the ends of the cylinders are alternately opened to the atmosphere and to the air-exhaust, annular chambers encircling the extensions and connected therewith by ports, tubes adapted to connect the annular chambers to the pulsation pipes of a milk cradle, and a pipe adapted to connect a milk bucket to the space exhausted of air between the pistons.

7. In apparatus for milking cows, a pulsator comprising two cylinders, an extension of smaller diameter to each cylinder, pistons connected together in two pairs and fitting the cylinders and extensions, means for maintaining the space between the pistons in one cylinder constantly open to the atmosphere and the corresponding space in the other cylinder constantly exhausted of air, means whereby the spaces between the ends of the cylinders and the pistons are alternately open to the atmosphere and exhausted of air, a milk pipe and a cradle, a flexible pipe connecting the milk pipe and cradle, a milk releaser upon the milk pipe, and means for connecting said cradle to the part of one of the cylinders which is alternately open to atmosphere and exhausted of air.

8. In apparatus for milking cows, a milk cradle having milk and pulsation pipes, an air tube having ports communicating with the milk pipe and pulsation pipe of the cradle, a valve slidable in the air tube and a light spring normally holding the valve over one of the said ports.

9. In apparatus for milking cows, a milk cradle having milk and pulsation pipes, an air tube having a closed end and having ports communicating with the milk pipe and pulsation pipe of the cradle, a valve slidable in the air tube and a light spring normally holding the valve over one of the said ports, a cap rotatable upon said closed end of the tube, said closed end and the cap having ports adapted to be brought into correspondence and a cap at the other end of the tube and removable for cleaning purposes.

10. In apparatus for milking cows, a teat cup comprising a casing with an internal shoulder, a rubber lining in the casing, a cap gripping the top of the lining, a plate fitting the interior of the lining and adapted to close the same against the internal shoulder, a nipple upon the plate, a disk having a flange for gripping the lining against the plate, means for forcing the disk and plate toward one another, and a nipple upon the casing communicating with the exterior of the lining.

11. In apparatus for milking cows, the combination with a milk receiver having an opening, of a reciprocating releaser chamber having an opening, adapted to register with the first mentioned opening to permit milk to pass from said receiver into said releasing chamber, means for actuating said chamber, and means for subsequently discharging the milk from said chamber.

12. In apparatus for milking cows, the combination with a milk receiver having an opening of a plurality of releasing chambers, means for reciprocating said chambers across said opening from the receiver whereby said chambers one after the other receive milk from the receiver, and means whereby the milk is then discharged from the chambers.

13. In apparatus for milking cows, a milk receiver, a bracket attached to the milk receiver having an opening therethrough from the receiver and an inclined bed, sliding chambers having a correspondingly inclined base, means for reciprocating the chambers across said opening in the bracket, whereby said chambers one after the other receive milk from the receiver, and means whereby the milk is discharged from the chambers.

14. In apparatus for milking cows, a milk receiver having a port open to an air exhauster and a milk opening, one or more releasing chambers, means for reciprocating the chambers across said opening of the releaser, and an outflow valve upon each releasing chamber.

15. In apparatus for milking cows, a milk receiver, milk releasing chambers having in common an inclined valve face, a bracket having a corresponding face upon which the releasing chambers slide and through which is an opening leading to the milk receiver.

16. In apparatus for milking cows, a milk releaser comprising a receiver, means for connecting the receiver to an air exhauster, a milk pipe connected to the receiver, releaser chambers having an inclined base, a slide bracket having an inclined bed upon which the releaser chambers are reciprocated and a port therethrough, a socket on the bracket at said port, a spigot upon the receiver fitting the said socket, each of the said chambers having a port which ports alternately come into correspondence with said port in the face of the bracket, and an outlet valve upon each of the chambers.

17. In apparatus for milking cows, a releaser, releasing chambers slidable on the releaser, a piston and piston rod connected to the releasing chambers, a cylinder wherein the piston is slidable, a slide valve consisting of a plate having ports and a recess, a pipe adapted to connect an air exhauster to the releaser, a branch pipe connecting the said pipe to a port in the cylinder, the said port being in constant communication with the recess in the valve, ports communicating with the respective ends of the cylinder, the said ports being brought alternately into communication with the ports and the recess in the slide valve, a fly wheel and shaft, an eccentric on the shaft, an eccentric rod connecting the eccentric to the slide valve, a pin projecting from the eccentric, a connecting rod coupling the said pin to the piston rod, the hole in the communicating rod being elongated to provide lost motion for the said pin.

In testimony whereof I have signed my name to this specification in the presence of two witnesses.

HENRY DROUTLEGE.

Witnesses:
A. L. FERNEYHOUGH,
R. AITCHISON.